US012560167B2

(12) United States Patent
Martin et al.

(10) Patent No.: US 12,560,167 B2
(45) Date of Patent: Feb. 24, 2026

(54) SCREW PUMP AND ITS COMPONENTS

(71) Applicant: Illinois Tool Works Inc., Glenview, IL (US)

(72) Inventors: Lionel Martin, Sallanches (FR); Didier Richard, Marignier (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/734,744

(22) Filed: Jun. 5, 2024

(65) Prior Publication Data

US 2024/0410363 A1 Dec. 12, 2024

(30) Foreign Application Priority Data

Dec. 4, 2023 (EP) .................................... 23315447
May 15, 2024 (EP) .................................... 24176065

(51) Int. Cl.
*F04C 2/16* (2006.01)
*F04C 15/00* (2006.01)

(52) U.S. Cl.
CPC .......... *F04C 2/165* (2013.01); *F04C 15/0088* (2013.01); *F04C 2240/20* (2013.01); *F05C 2203/02* (2013.01); *F05C 2225/00* (2013.01); *F05C 2251/14* (2013.01); *F05C 2253/04* (2013.01); *F05C 2253/16* (2013.01)

(58) Field of Classification Search
CPC .... F04C 2/165; F04C 2/16; F04C 2/18; F04C 15/0088; F04C 18/16; F04C 2240/20; F04C 2240/30; F04C 2203/02; F04C 2225/00; F04C 2225/04; F04C 2251/14; F04C 2253/04; F04C 2253/16; F04C 2230/21
See application file for complete search history.

(56) References Cited

U.S. PATENT DOCUMENTS

| | | | | |
|---|---|---|---|---|
| 3,146,723 | A | 9/1964 | Wildhaber | |
| 5,165,881 | A | 11/1992 | Wicen | |
| 5,223,052 | A | 6/1993 | Yamamoto | |
| 5,314,321 | A * | 5/1994 | Yamamoto | F01C 21/08 418/178 |
| 10,920,771 | B2 | 2/2021 | Böhm | |
| 11,313,333 | B2 | 4/2022 | Becker | |
| 11,415,134 | B2 | 8/2022 | Itou | |

(Continued)

FOREIGN PATENT DOCUMENTS

| | | | |
|---|---|---|---|
| CN | 211 370 726 | * | 8/2020 |
| CN | 112539171 | | 3/2021 |

(Continued)

OTHER PUBLICATIONS

Int'l Search Report and Written Opinion Appln No. PCT/US2023/068200 mailed Oct. 2, 2023.

(Continued)

*Primary Examiner* — Dapinder Singh
(74) *Attorney, Agent, or Firm* — McAndrews Held & Malloy, Ltd.

(57) ABSTRACT

The disclosure relates to a screw pump comprising: a casing with an inlet, an outlet and a flow chamber between the inlet and the outlet; and at least two screws housed in the flow chamber to force a fluid flow through the flow chamber from the inlet to the outlet; wherein at least one of the screws comprises a lubricated polymer material.

14 Claims, 9 Drawing Sheets

(56) References Cited

U.S. PATENT DOCUMENTS

| | | | | |
|---|---|---|---|---|
| 11,549,765 | B2 | 1/2023 | Hoffmann | |
| 11,852,141 | B2 | 12/2023 | Metz | |
| 11,867,180 | B2 * | 1/2024 | Pande | F04C 18/52 |
| 11,913,370 | B2 | 2/2024 | Osmun | |
| 2008/0031762 | A1 * | 2/2008 | Mosemann | F04C 18/084 418/201.3 |
| 2008/0080996 | A1 | 4/2008 | Kataoka | |
| 2009/0016920 | A1 * | 1/2009 | Yamamoto | F04C 18/16 418/201.1 |
| 2009/0148331 | A1 * | 6/2009 | Kaplan | F04C 18/126 418/201.1 |
| 2012/0288395 | A1 | 11/2012 | Wagner | |
| 2013/0183185 | A1 | 7/2013 | Dirscherl | |
| 2015/0252719 | A1 | 9/2015 | Pryor | |
| 2020/0240411 | A1 | 7/2020 | Foerster | |
| 2022/0344747 | A1 | 10/2022 | Pawellek | |
| 2022/0381178 | A1 | 12/2022 | Richard | |
| 2023/0023855 | A1 * | 1/2023 | Borriello | F04C 2/16 |

FOREIGN PATENT DOCUMENTS

| | | | |
|---|---|---|---|
| DE | 10051731 | | 5/2002 |
| DE | 102008064159 | B3 | 1/2010 |
| DE | 202009003980 | | 8/2010 |
| DE | 102011079226 | B4 | 12/2014 |
| DE | 102017112743 | B3 | 10/2018 |
| DE | 102017205847 | A1 | 10/2018 |
| DE | 102015218679 | B4 | 8/2019 |
| DE | 102018112492 | | 10/2019 |
| DE | 102019210873 | | 1/2021 |
| DE | 202021106860 | U1 | 12/2022 |
| DE | 202021106861 | U1 | 12/2022 |
| DE | 102021131017 | A1 | 5/2023 |
| DE | 102021133484 | A1 | 6/2023 |
| DE | 102021133495 | A1 | 6/2023 |
| EP | 1475537 | B1 | 1/2007 |
| EP | 1475536 | B1 | 11/2007 |
| EP | 2317145 | | 5/2011 |
| EP | 2423509 | | 2/2012 |
| EP | 1960671 | B1 | 7/2012 |
| EP | 2532895 | | 12/2012 |
| EP | 2916007 | | 9/2015 |
| EP | 3007330 | B1 | 9/2017 |
| EP | 3232541 | B1 | 12/2018 |
| EP | 3412865 | | 12/2018 |
| EP | 3460180 | A1 | 3/2019 |
| EP | 3232065 | B1 | 1/2020 |
| EP | 3232543 | B1 | 4/2020 |
| EP | 3812546 | | 4/2021 |
| EP | 3816419 | | 5/2021 |
| EP | 3816419 | A1 | 5/2021 |
| EP | 3816446 | | 5/2021 |
| EP | 3913187 | | 11/2021 |
| EP | 3961035 | | 3/2022 |
| EP | 3994757 | A1 | 5/2022 |
| EP | 4015769 | | 6/2022 |
| EP | 4008903 | B1 | 1/2023 |
| EP | 3899281 | B1 | 3/2023 |
| EP | 3924624 | B1 | 4/2023 |
| EP | 4198260 | | 6/2023 |
| EP | 4198261 | | 6/2023 |
| EP | 4198310 | | 6/2023 |
| EP | 4198311 | | 6/2023 |
| EP | 3994344 | B1 | 7/2023 |
| EP | 4298347 | A1 | 1/2024 |
| EP | 4298348 | A1 | 1/2024 |
| EP | 4305286 | A1 | 1/2024 |
| EP | 4367400 | A1 | 5/2024 |
| FR | 2429909 | | 1/1980 |
| FR | 2855565 | | 12/2004 |
| GB | 906430 | | 9/1962 |
| GB | 2076471 | | 12/1981 |
| JP | H 01 301977 | * | 12/1989 |
| JP | H0275789 | | 3/1990 |
| KR | 102658957 | B1 | 4/2024 |
| SE | 217570 | | 12/1967 |
| WO | 8605555 | | 9/1986 |
| WO | 2007030898 | | 3/2007 |
| WO | 2016202334 | | 12/2016 |
| WO | 2017186801 | A1 | 11/2017 |
| WO | 20109553 | A1 | 6/2020 |
| WO | 2021086603 | | 5/2021 |
| WO | 2023240231 | A1 | 12/2023 |
| WO | 2023240232 | A1 | 12/2023 |
| WO | 2023240234 | A1 | 12/2023 |
| WO | 2023240238 | A1 | 12/2023 |
| WO | 2023240239 | A1 | 12/2023 |
| WO | 2024115078 | A1 | 6/2024 |
| WO | 2024184527 | A1 | 9/2024 |

OTHER PUBLICATIONS

Int'l Search Report and Written Opinion Appln No. PCT/US2023/068194 mailed Sep. 5, 2023.

Int'l Search Report and Written Opinion Appln No. PCT/US2023/068197 mailed Oct. 30, 2023.

Int'l Search Report and Written Opinion Appln No. PCT/US2023/068205 mailed Sep. 29, 2023.

Int'l Search Report and Written Opinion Appln No. PCT/US2023/068206 mailed Sep. 29, 2023.

European Office Communication with extended search report Appln No. 24176065.1 dated Aug. 27, 2024.

* cited by examiner

SCREW PUMP AND ITS COMPONENTS

TECHNICAL FIELD

The disclosure relates to the field of screw pumps and their components. More specifically, but not exclusively, this disclosure also relates to a cooling circuit, for example for a vehicle, that comprises the screw pump.

BACKGROUND

Known screw pumps comprise a casing and two, three or more screws housed in the casing, which are driven by a motor to force fluid flow through the pump.

BRIEF SUMMARY

The disclosure aims to improve the known designs of screw pumps and their performance.

The disclosure relates to a screw pump comprising: a casing with an inlet, an outlet and a flow chamber between the inlet and the outlet, and at least two screws housed in the flow chamber to force a fluid flow through the flow chamber from the inlet to the outlet, wherein at least one of the screws comprises a lubricated polymer material.

The inventors have determined that forming at least one of the screws from a lubricated polymer material provides a surprising improvement to the performance of the screw pump.

The two or more screws may comprise at least one drive screw and at least one driven screw. The at least one screw comprising a lubricated polymer material may comprise at least one drive screw. The at least one screw comprising a lubricated polymer material may comprise at least one driven screw.

At least one of the screws may comprise a polyphenylene sulfide material, which may but need not be lubricated. The lubricated polymer material may comprise polyphenylene sulfide. The lubricated polymer material may comprise a lubricant, for example a solid lubricant or a dry lubricant. The lubricant may comprise one of polytetrafluorethylene (PTFE), molybdenum disulfide and carbon or graphite.

In some examples, some, but not all, of the screws may comprise a lubricated polymer material. Some, but not all, of the screws may comprise a polyphenylene sulfide material, which may but need not be lubricated. The lubricated polymer material may comprise a lubricant, for example a solid lubricant or a dry lubricant. The lubricant may comprise one of polytetrafluorethylene (PTFE), molybdenum disulfide and carbon or graphite.

In some examples, the at least one drive screw comprises a lubricated polymer material, for example a solid lubricant or a dry lubricant, whilst the at least one driven screw may be devoid of lubricant or at least devoid of a solid lubricant or a dry lubricant.

In some examples, at least two of the screws may comprise a lubricated polymer material. For example, where the screw pump comprises three or more screws, some but not all of them may comprise a lubricated polymer material. In other examples, all of the screws comprise a lubricated polymer material.

The at least one drive screw and the at least one driven screw may both comprise a lubricated polymer material, for example a solid lubricant or a dry lubricant.

The at least one drive screw may comprise a first lubricant and/or the at least one driven screw may comprise a second lubricant. Each of the first and second lubricants may comprise one of polytetrafluorethylene (PTFE), molybdenum disulfide and carbon or graphite.

The second lubricant may be a different lubricant from the first lubricant. Each of the first and second lubricants may comprise a different one of polytetrafluorethylene (PTFE), molybdenum disulfide and carbon or graphite.

The drive screw may comprise a different concentration of lubricant, e.g. of the same lubricant, relative to the at least one driven screw.

In some examples, at least two of the screws may comprise a polyphenylene sulfide material, which may but need not be lubricated. For example, where the screw pump comprises three or more screws, some but not all of them may comprise a polyphenylene sulfide material, which may but need not be lubricated.

The lubricated polymer material may be filled, for example with fibers such as glass fibers. The lubricated polymer material may be reinforced, for example with fibers such as glass fibers.

The lubricated polymer material may comprise a fiber reinforced lubricated polymer material. The fibers may comprise glass. The fiber reinforced lubricated polymer material may comprise a glass fiber reinforced lubricated polymer material.

The polyphenylene sulfide material may comprise a fiber reinforced polyphenylene sulfide material which may, but need not be lubricated. The fibers may comprise glass. The fiber reinforced polyphenylene sulfide material may comprise glass fiber reinforced polyphenylene sulfide material.

In some examples, the at least one drive screw comprises a fiber reinforced lubricated polymer material, for example a fiber reinforced lubricated polyphenylene sulfide material, and the at least one driven screw may be devoid of fibers and/or lubricant.

The casing can comprise a shell within which an insert defining the flow chamber is housed.

The insert may comprise a polymer material, which may be lubricated.

The disclosure also relates to an insert for a screw pump as described above. The insert may define a flow chamber for receiving and housing at least two screws. The insert may comprise or be formed of a lubricated polymer material.

The disclosure also relates to an insert for a screw pump, the insert defining a flow chamber for receiving and housing at least two screws, wherein the insert comprises or is formed of a lubricated polymer material.

The disclosure also relates to a casing for a screw pump, e.g. a screw pump as described above, the casing comprising or being formed of a lubricated polymer material and defining a flow chamber for receiving and housing at least two screws.

The disclosure also relates to a casing for a screw pump, e.g. a screw pump as described above, the casing comprising a shell within which an insert is housed, wherein the insert comprises or is formed of a lubricated polymer material and defines a flow chamber for receiving and housing at least two screws.

At least part of the casing, e.g. the insert, may comprise a polyphenylene sulfide material. The polymer material may be filled, for example with fibers such as glass fibers. The polymer material may be reinforced, for example with fibers such as glass fibers.

The polymer from which the casing, casing part or insert is formed may be lubricated. The casing, casing part or insert may comprise a lubricated polymer material. The lubricated polymer material may comprise polyphenylene sulfide.

The casing, casing part or insert may comprise a polyphenylene sulfide material, which may but need not be lubricated.

The casing, casing part or insert may comprise a fiber reinforced lubricated polymer material, which may comprise glass fibers. The casing, casing part or insert may comprise a glass fiber reinforced lubricated polymer material.

The casing, casing part or insert may comprise a fiber reinforced polyphenylene sulfide material which may comprise glass fibers. The fiber reinforced polyphenylene sulfide material from which the insert is formed may, but need not be lubricated. The casing, casing part or insert may comprise a glass fiber reinforced polyphenylene sulfide (PPS) material.

In some examples, the at least one screw (e.g. the driven screw) comprises a lubricated polymer material, which need not be fiber reinforced, and the insert comprises a fiber reinforced lubricated polymer material. The skilled person will appreciate that this may be beneficial in some applications.

The flow chamber can be defined by a tubular wall of the insert. The tubular wall can present, or can have, a substantially constant wall thickness. The tubular wall can have several cylindrical lobes, which can approximate the outer profile of the meshing screws. The cylindrical lobes can comprise a center lobe, for example which approximates the outer surfaces of a center drive screw. The cylindrical lobes can comprise an outer lobe on each side of the center lobe, for example which approximates the outer surfaces of a respective driven screw. The flow chamber can provide minimal space between the screws, while allowing them to rotate freely.

The casing can comprise a space between the shell and the insert. The interface between the shell and the insert can be designed to allow, when in use, part of the circulating fluid to enter the space. The space can be separate from the flow chamber and/or not be part of it.

The insert can comprise one or more anti-rotation protrusions, which can engage with the shell to inhibit relative rotation between them. The or each anti-rotation protrusion can extend axially from the insert. The or each anti-rotation protrusion can comprise an antirotation tab. The insert can comprise one or more anti-rotation protrusions extending from one or each of its ends. The insert can comprise a flange or clamp, such as a circular flange or clamp, at one end. The flange or clamp can have a perimeter which approximates an inner surface of the shell, for example to position the insert within the shell.

At least one of the screws (e.g. the drive screw) may have a center shaft made of a first material on which the screw is molded from a second material.

For the sake of clarity, the first material and the second material can be materials that are distinct from each other or materials that are similar.

The first and second materials can be different. Advantageously, the first material is stiffer than the second material, for example such that the at least one screw is reinforced. The first material can comprise a metal, for example steel such as stainless steel, or a stiff polymer. The second material can comprise a polymer, wherein case the first material can comprise a polymer that is stiffer than the polymer of the second material. Thus, according to one aspect, the second material can be less stiff than the first material.

According to one aspect of the disclosure, at least one of the screws comprises a center shaft made of a first material on which the screw is molded from a second material that is less stiff than the first material.

As a variant, the first and second materials can be identical or similar. The first and second material can each comprise a polymer, for example a similar polymer.

The first and second materials can comprise one or more polymers. At least one of the polymers can comprise PPS. The polymer, for example PPS, can be filled, for example with fibers such as glass fibers. The polymer, for example PPS, can be lubricated. The first and second materials can comprise the same polymer, for example PPS, which can be filled or additivated or neither differently for each of the first and second materials.

The center shaft can comprise one or more anchoring features or elements or members. The anchoring feature or features can be embedded in the second material, for example to anchor the center shaft in the second material.

The or each anchoring feature can comprise a rib or a spline, for example an axial rib or spline. The or each anchoring feature can extend along at least part of the center shaft.

The anchoring feature or features can comprise at least two anchoring features, or at least two groups of anchoring features, that can be spaced along the length of the center shaft.

The at least one reinforced screw can comprise a drive screw whose center shaft can comprise a motor coupling, for example to receive torque from a drive motor.

The disclosure also relates to a method of manufacturing a screw for a screw pump, the method comprising: providing a center shaft made of a first material, and molding a screw on the center shaft using a second, lubricated polymer material.

For the sake of clarity, the first material and the second material can be materials that are distinct from each other or materials that are similar.

The first and second materials can be different. The method can comprise: inserting the center shaft into the mold before the screw is molded on it. Advantageously, the first material is stiffer than the second material, for example such that the at least one screw is reinforced. The first material can comprise a metal or a stiff polymer.

Thus, according to one aspect, the second material can be less stiff than the first material.

As a variant, the first and second materials can be similar. The first and second materials can comprise a polymer. The method can comprise: molding the center shaft using the first material, for example before molding the screw on the center shaft using the second material. The method can comprise a two-step molding process.

The pump can comprise a flexible coupling. The flexible coupling can be connected to one of the screws to couple the screw to a drive motor. The flexible coupling can be connected to the motor coupling of the center shaft of the drive screw.

The flexible coupling can comprise a first side or end, for example with a first coupling feature to engage a shaft of a drive motor. The flexible coupling can comprise a second side or end, for example with a second coupling feature engaging a cooperating feature of the screw to which it is connected.

The first coupling feature can be a slot, which can be diametrical and/or which can be designed to house a protrusion on a shaft of the or of a drive motor. The second coupling feature can be a protrusion, for example to engage in a cooperating feature of the drive screw. The protrusion can be rectangular. The second coupling feature can be rotationally offset, for example by 90 degrees, relative to the first coupling feature.

The flexible coupling can comprise a polymer material, which can be lubricated, for example in its mass and/or by greasing.

At least one of the screws can be non-self-locking. The at least one screw can comprise one or more threads each having a pitch and/or a diameter and/or a configuration that enables it to be ejected from a mold by applying an axial force to it, for example without applying a rotational force to it. The at least one screw can comprise one or more threads each having a helix angle that enables them to be ejected from a mold by applying an axial force to it, for example without applying a rotational force to it.

The helix angle can be at least 60°, for example at least 70°. The at least one screw can be made of a polymer, for example polyphenylene sulfide (PPS). The polymer, for example PPS, can be filled, for example with fibers such as glass fibers. The polymer, for example PPS, can be lubricated.

The disclosure also relates to a method of manufacturing a screw for a screw pump, the method comprising molding a screw in a molding tool using a lubricated polymer material and ejecting the screw from the mold by applying an axial force to it, wherein the material and threads of the screw are configured such that the axial force causes the screw to rotate freely in the mold.

The screw's self-locking can be inhibited by its configuration, in particular the helix angle of the thread or of each of the threads and/or the coefficient of friction between the thread or threads and the surfaces of the mold.

The disclosure also relates to a screw pump comprising: a casing with an inlet, an outlet and a flow chamber between the inlet and the outlet, and at least two screws housed in the flow chamber to force a fluid flow through the flow chamber from the inlet to the outlet, wherein at least one of the screws can be obtained by the method described above.

As a variant, at least one of the screws can be self-locking. The at least one screw can comprise one or more threads each having a pitch and/or a diameter and/or a configuration that prevents it from being ejected from a mold by applying an axial force to the latter, for example without applying a rotational force to the latter. The at least one screw can comprise one or more threads each having a helix angle that prevents them from being ejected from a mold by applying an axial force to the latter, for example without applying a rotational force to the latter.

The helix angle can be less than 60°. The at least one screw can be made of a polymer, for example polyphenylene sulfide (PPS). The polymer, for example PPS, can be filled, for example with fibers such as glass fibers. The polymer, for example PPS, can be lubricated.

According to one aspect of the disclosure, at least one screw comprises a release coupling to restrict the rotation of the screw when it is being extracted from a molding tool.

According to one aspect of the disclosure, each screw comprises a release coupling to restrict the rotation of the screw when it is being extracted from a molding tool.

Of course, according to different variants of the disclosure, at least one or each screw, for example the or each self-locking screw, can comprise a release coupling. The release coupling can be used to restrict the rotation of the screw when it is being extracted from a molding tool.

The insert can comprise at least one recess. The or each recess can be designed to house one of the release couplings, for example when the screws are housed in the flow chamber. One of the release couplings can be housed inside the recess.

In each of the aforementioned aspects of the disclosure, the screws can comprise three or more screws, or four or more screws. The screws can comprise at least one drive screw and at least one driven screw, for example at least two driven screws. Advantageously, the screws can comprise at least three driven screws, which can be distributed, for example evenly, around the drive screw.

In some examples, at least one of the driven screws may comprise a lubricated polymer material, which need not be fiber reinforced, and the at least one drive screw comprises a fiber reinforced lubricated polymer material. In such examples, the drive screw may comprise the center shaft made of the first material on which the screw is molded from the second material. The second material may comprise the fiber reinforced lubricated polymer material. In such examples, the or each driven screw may be devoid of a center shaft formed of a different material. In such examples, the or each driven screw may be formed only of a lubricated polymer material, which need not be fiber reinforced.

The disclosure also relates to a method of manufacturing a screw for a screw pump, the method comprising molding a screw in a molding tool using a lubricated polymer material and ejecting the screw from the mold by applying torque to a screw release coupling while unscrewing the screw from the mold.

The release coupling of at least one of the screws can comprise at least one radial shoulder. The release coupling of at least one of the screws can comprise a circular or non-circular structure. The release coupling of at least one of the screws can comprise an annular or partially annular structure.

The disclosure also relates to a cooling circuit for a vehicle comprising a screw pump as described above.

For the avoidance of doubt, all the features described herein also apply to any aspect of the disclosure.

As part of this application, it is expressly provided that the various aspects, embodiments, examples and alternatives disclosed in the preceding paragraphs and/or in the following description and drawings, and in particular the individual features thereof, can be taken separately or in any combination. In other words, all aspects and/or features of any aspect can be combined in any way, unless these features are incompatible.

For the avoidance of doubt, the terms "can", "and/or", "for example", and any other similar term used herein must be interpreted as not limiting, such that any feature described herein is not necessarily required to be present. Indeed, any combination of optional features is expressly foreseen without departing from the scope of the disclosure.

BRIEF DESCRIPTION OF THE DRAWINGS

Other features and advantages of the disclosure will become apparent from the following detailed description, which will be understood in reference to the appended drawings, in which.

DETAILED DESCRIPTION

Different aspects of different aspects of the disclosure are described in more detail below, in reference to FIGS. 1 to 16 appended hereto.

Figure 1:
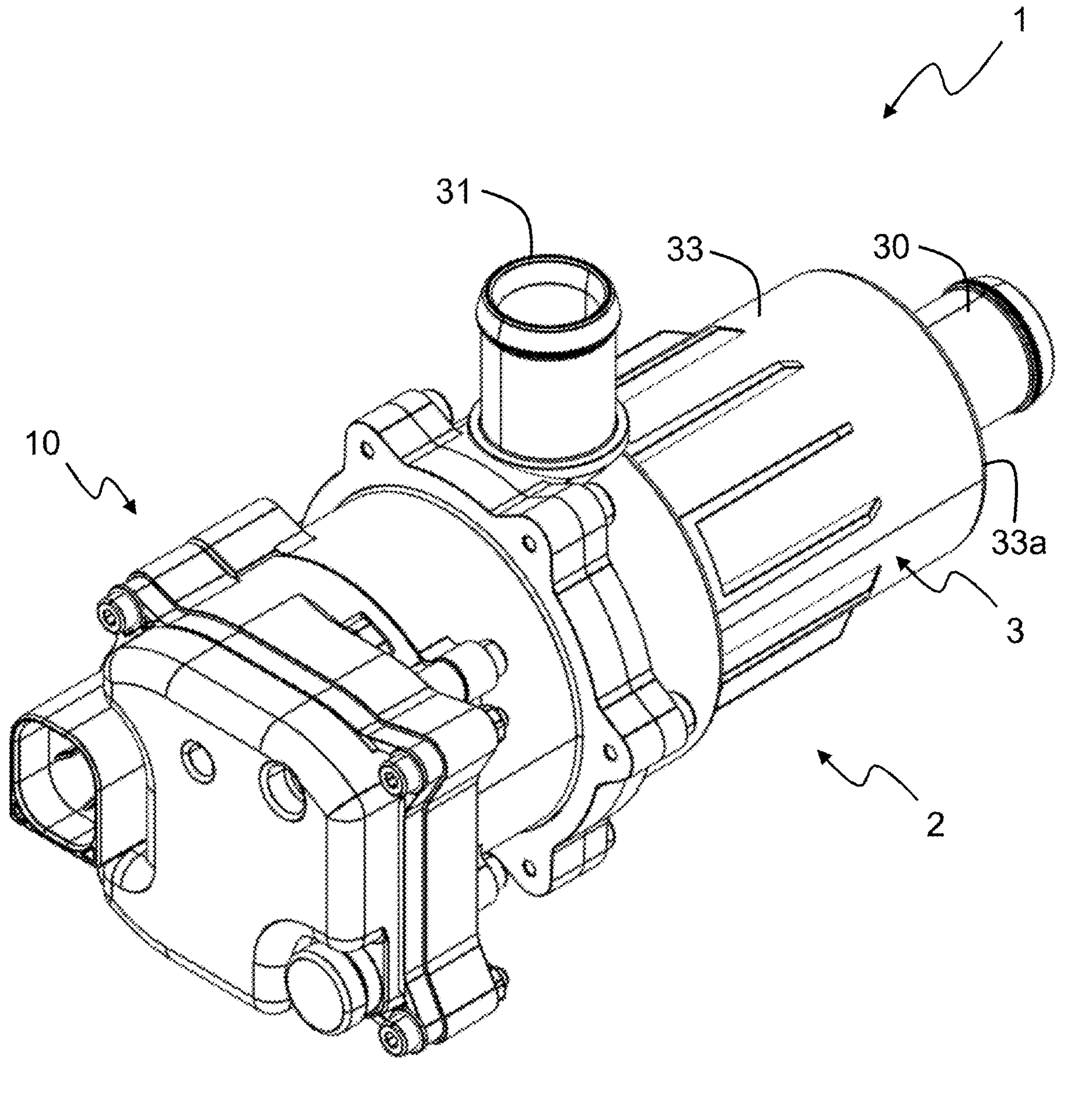
FIG. 1 illustrates a pump assembly according to one aspect of the disclosure.
Figure 2:
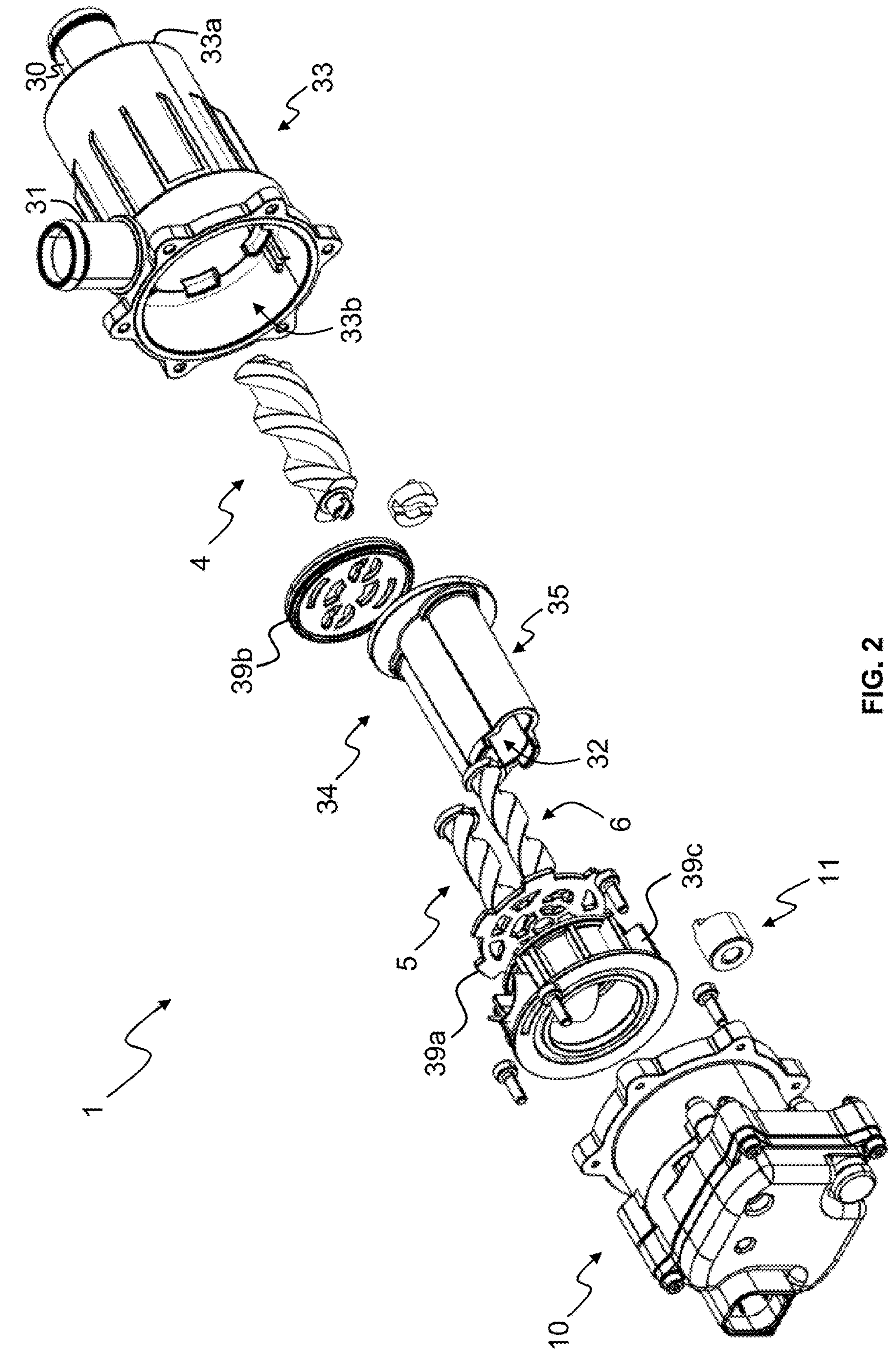
FIG. 2 is an exploded view of the pump assembly in FIG. 1.

Referring now to FIGS. 1 and 2, a screw pump assembly 1 is shown, which comprises a motor 10 coupled to a screw pump 2 by a flexible coupling 11. The screw pump 2 comprises a casing 3 with an inlet pipe 30, an outlet pipe 31 and a flow chamber 32 between the inlet 30 and the outlet 31. Three screws 4, 5, 6 are housed in the flow chamber 32 to force fluid flow through the flow chamber 32 from the inlet 30 to the outlet 31. Preferably, at least one of the screws 4, 5, 6 comprises a lubricated polymer material. In this specific example, all of the screws comprise a polyphenylene sulfide (PPS) material containing a solid or dry lubricant, such as polytetrafluorethylene (PTFE), molybdenum disulfide and carbon or graphite.

The casing 3 comprises a shell 33 within which an insert 34 defining the flow chamber 32 is housed. In this example, the insert 34 also comprises a lubricated polymer material, specifically a glass fiber reinforced PPS material containing a solid or dry lubricant, such as polytetrafluorethylene (PTFE), molybdenum disulfide and carbon or graphite.

The shell 33 is in the shape of a hollow cylinder with a closed end 33*a* from which the inlet pipe 30 protrudes. The outlet pipe 31 radially protrudes from the shell 33, next to an open end 33*b*. The screw pump 2 is reversible and, as such, the inlet pipe 30 and the outlet pipe 31 can be reversed by rotating the screw pump 2 in the opposite direction. However, for the sake of simplicity, the axial pipe 30 protruding from the closed end 33*a* will hereinafter be referred to as the inlet pipe 30 and the radial pipe 30 protruding from the open end 33*b* will hereinafter be referred to as the outlet pipe 31.

Figure 3:
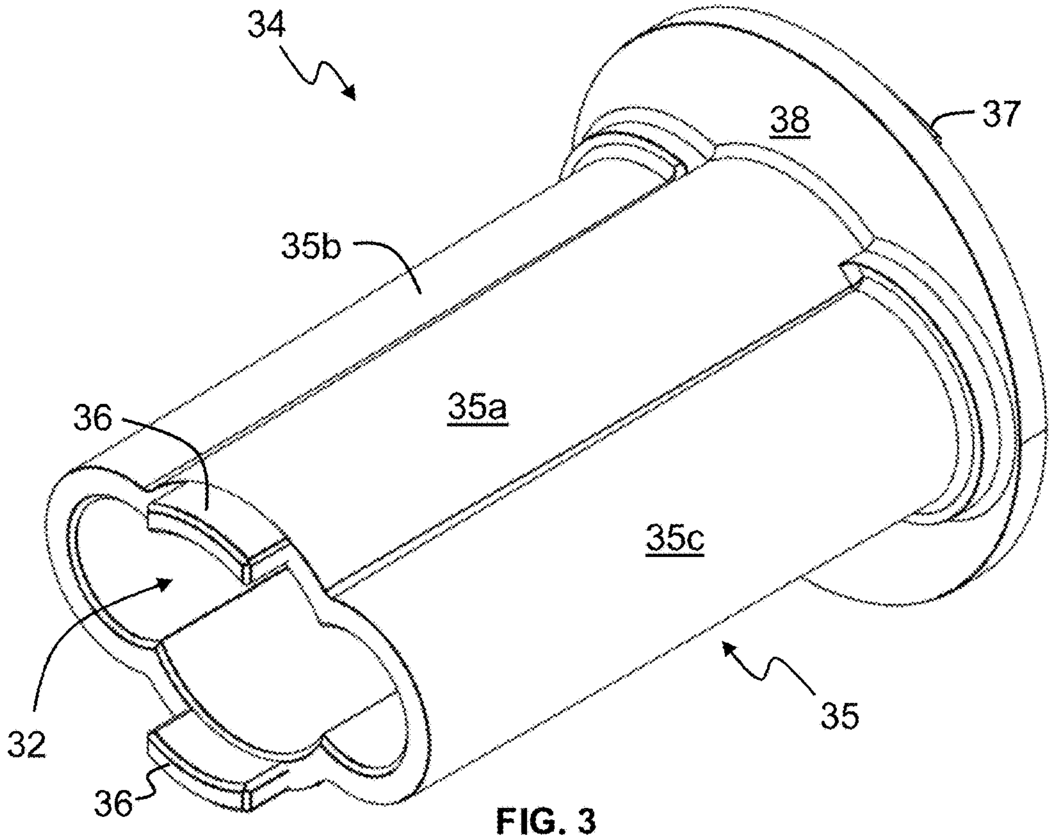
FIG. 3 illustrates a first side of the flow chamber insert of the pump assembly in FIGS. 1 and 2.
Figure 4:
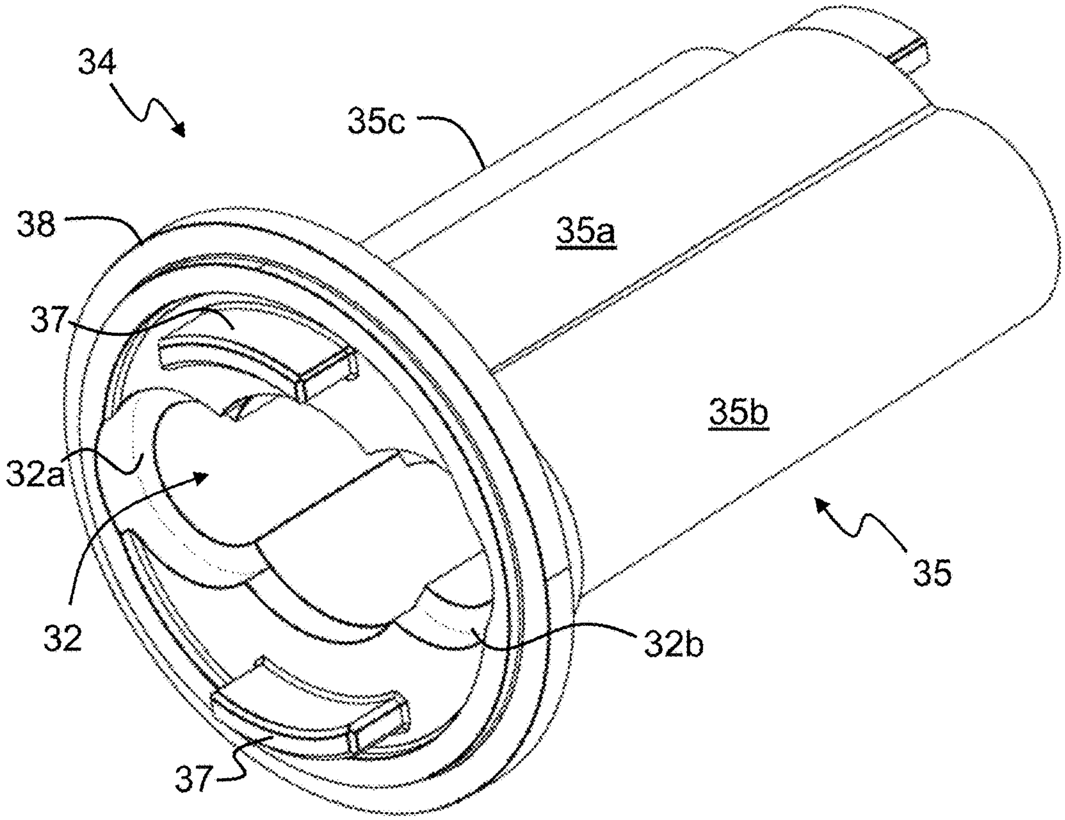
FIG. 4 illustrates a second side of the flow chamber insert in FIG. 3.
Figure 5:
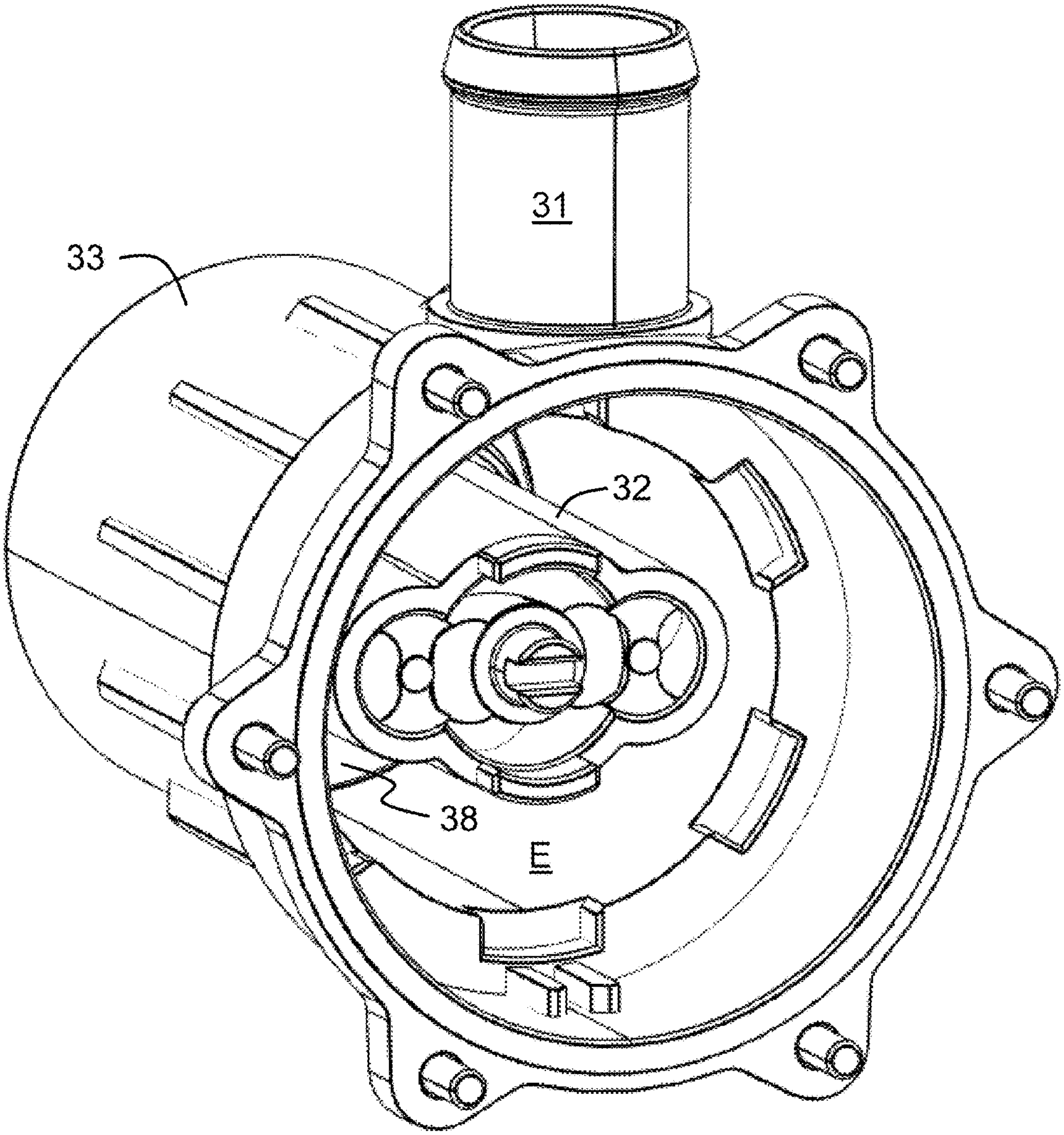
FIG. 5 illustrates the insert in FIGS. 3 and 4 housed in the shell of the casing and with the screws housed in the insert.

As shown in FIGS. 3 and 4, the flow chamber 32 is defined by a tubular wall 35 of the insert 34, which has a substantially constant wall thickness. The tubular wall 35 has three cylindrical lobes 35*a*, 35*b*, 35*c* which approximate the outer profile of the three meshing screws 4, 5, 6. More specifically, a center lobe 35*a* approximates the outer surfaces of a center drive screw 4, with an outer lobe 35*b*, 35*c* on each side of the center lobe 35*a*, each approximating the outer surfaces of a respective driven screw 5, 6. The flow chamber 32 provides minimal space between the screws 4, 5, 6, while allowing them to rotate freely.

The insert 34 also comprises a pair of anti-rotation tabs 36, 37 protruding axially from each of its ends. A first pair of anti-rotation tabs 36 protrudes from the upper and lower parts of the center lobe 35*a* at a first end of the insert 34. A second pair of anti-rotation tabs 37 protrudes from a circular flange 38, above and below the center lobe 35*a* at a second end of the insert 34. The circular flange 38 has a perimeter which approximates an inner surface of the shell 33, which makes it possible to position the insert 34 within the shell 33 and to create a space E between them, as more clearly shown in FIG. 5.

The casing 3 also comprises a pair of mounting discs 39*a*, 39*b* and a spacing interface 39*c*. The mounting discs 39*a*, 39*b* engage the anti-rotation tabs 36, 37 of the insert 34 and are attached inside the shell 33 to trap the screws 4, 5, 6 and the insert 34 between them. The spacing interface 39*c* sealingly closes the screw pump 2 and isolates the flow chamber 32 from the motor 10, but the interface between the shell 33 and the insert 34 is designed to allow, when in use, part of the circulating fluid to enter the space E.

In some examples, the first mounting disc 39*a* can be part of or integrated with the spacing interface 39*c*. In some examples, the second mounting disc 39*b* can be part of or integrated with the insert 34. When the second mounting disc 39*b* is part of the insert 34, the antirotation tabs protruding from the circular flange 38 can be omitted.

The presence of a space E between the shell 33 and the insert 34, which is filled with circulating fluid, provides a vibration-damping effect resulting from the interaction between screws 4, 5, 6. In addition, the person skilled in the art will understand that the use of a separate insert 34 makes it possible to manufacture the flow chamber 32 with great precision.

This also makes it easier to manufacture the insert 34 by injection molding, since it can be designed with a substantially constant wall thickness to optimize cycle time and part quality.

Figure 6:
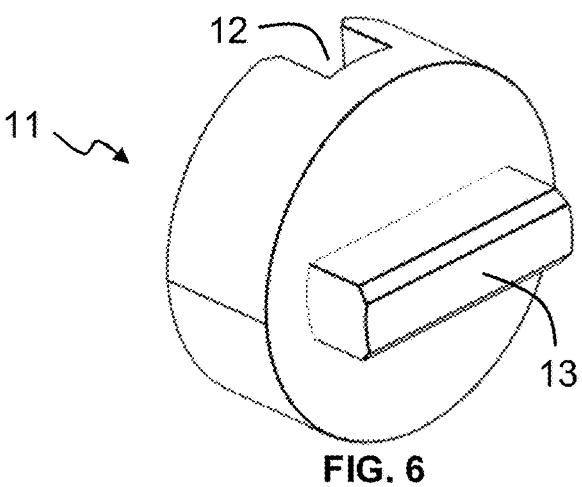
FIG. 6 illustrates the flexible coupling of the assembly in FIGS. 1 and 2, which couples the drive screw to the drive motor.

The flexible coupling 11, more clearly illustrated in FIG. 6, is substantially cylindrical and has a first coupling feature 12 at a first of its axial ends and a second coupling feature 13 at a second of its axial ends.

The first coupling feature 12 is a diametrical slot for designed to house a rectangular protrusion on a shaft of the drive motor 10. The second coupling feature 13 is a rectangular protrusion, which is rotationally offset by 90 degrees from the first coupling feature 12, to engage a cooperating feature of the drive screw 4.

In this example, the flexible coupling 11 is made of a lubricated polymer. The use of a flexible coupling between the drive motor 10 and the screw pump 2 makes it possible to accommodate minor angular and axial misalignment, while minimizing vibrations. The person skilled in the art will understand that this feature acts in synergy with the vibration damping effect of the space E between the shell 33 and the insert 34.

Figure 7:
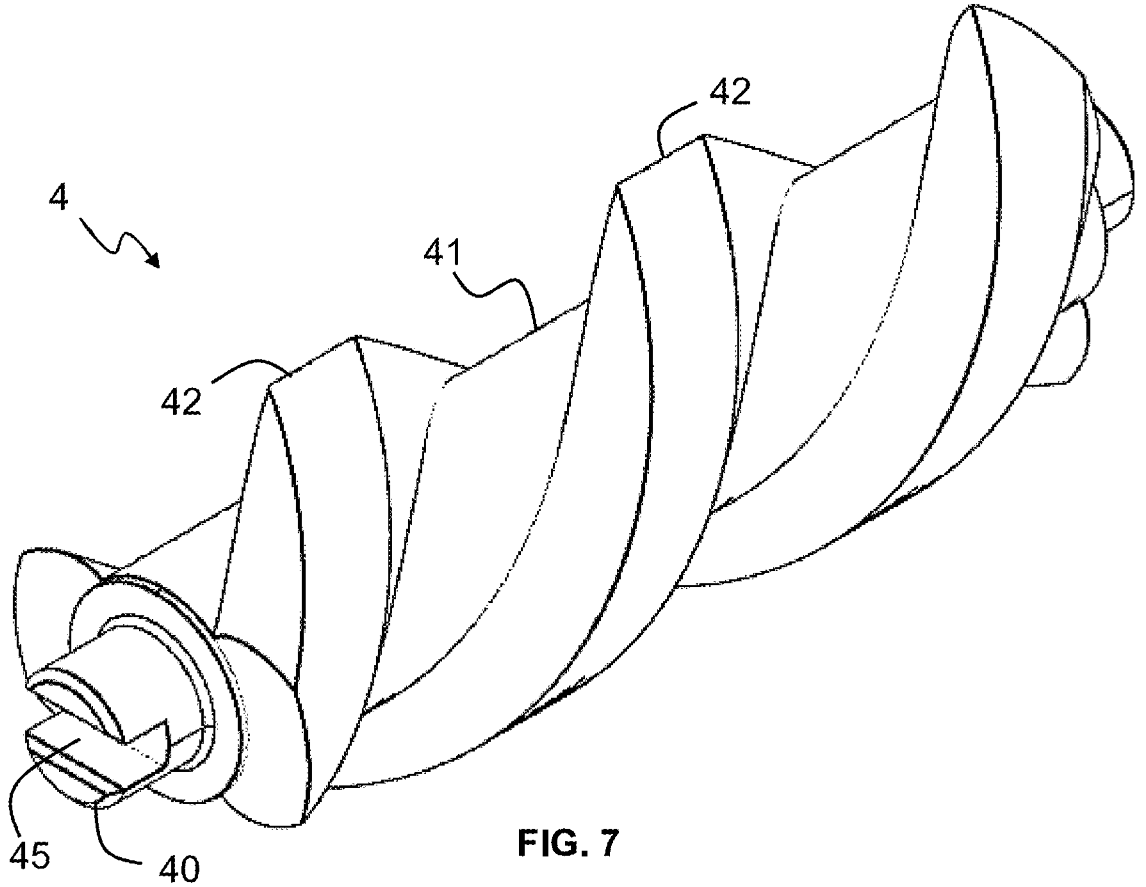
FIG. 7 illustrates the drive screw of the pump assembly in FIGS. 1 and 2.
Figure 8:
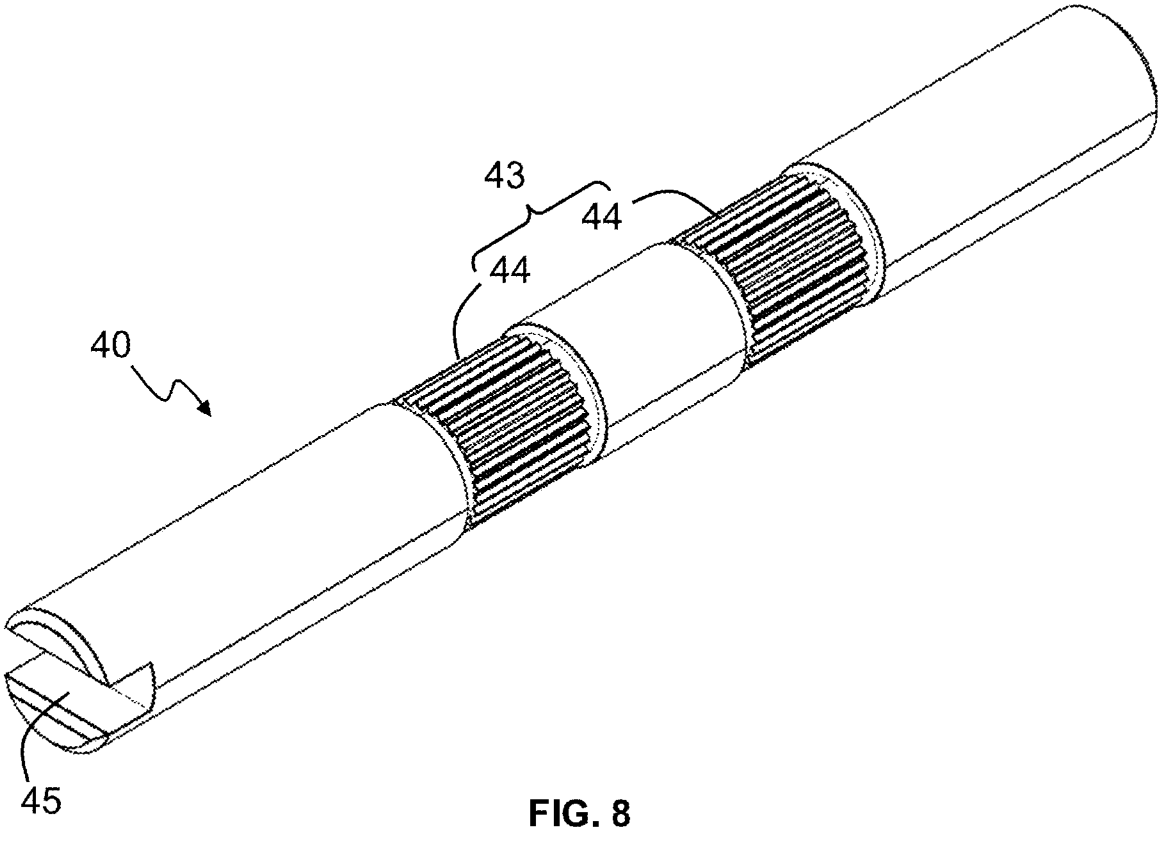
FIG. 8 illustrates the center shaft of the drive screw in FIG. 7.

The drive screw 4 is more clearly shown in FIG. 7, and comprises a center shaft 40 and a body 41 molded on the center shaft 40. In this example, the body 41 comprises two diametrically opposite threads 42 along its length.

The center shaft 40 comprises anchoring features 43 embedded in the body 41 to anchor the center shaft 40 to the body 41. In this example, the anchoring features 43 comprise two groups of axial splines 44 that extend along part of the center shaft 40. The two groups of axial splines 44 are spaced apart from one another along the length of the center shaft 40.

The center shaft 40 also comprises a motor coupling 45 in the form of a diametrical slot designed to house the rectangular protrusion 13 of the flexible coupling 11, although it can directly house the rectangular protrusion of the shaft of the drive motor 10. In this example, the center shaft 40 is made of stainless steel and the body 41 is made of a lubricated polymer material, specifically a glass fiber reinforced PPS material containing a solid or dry lubricant, such as polytetrafluorethylene (PTFE), molybdenum disulfide and carbon or graphite.

There are several advantages to using a polymer screw body 41 molded on a stainless-steel center shaft 40. The presence of the center shaft 40 reduces the thickness of the material required to form the body 41. The person skilled in the art will understand that this significantly reduces the cycle time and mitigates the tendency of the molded body 41 to deform when the material solidifies. In addition, the stiffness of the center shaft 40 also prevents the screw 4 from bending or deforming under load when torque is applied to it by the drive motor 10.

The person skilled in the art will also understand that this feature acts in synergy with the flexible coupling 11 and the vibration-damping effect of the space E between the shell 33 and the insert 34.

Figure 9:
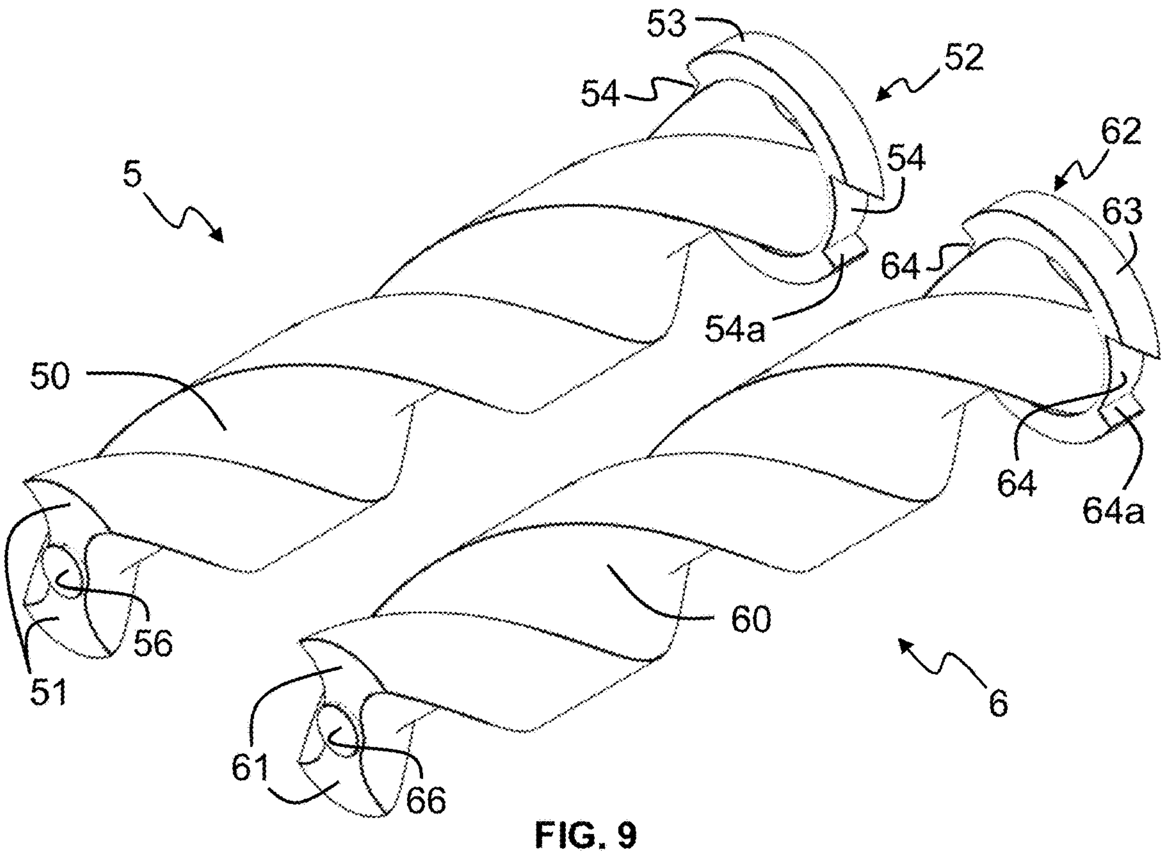
FIG. 9 illustrates a first side of the two driven screws of the pump assembly in FIGS. 1 and 2.
Figure 10:
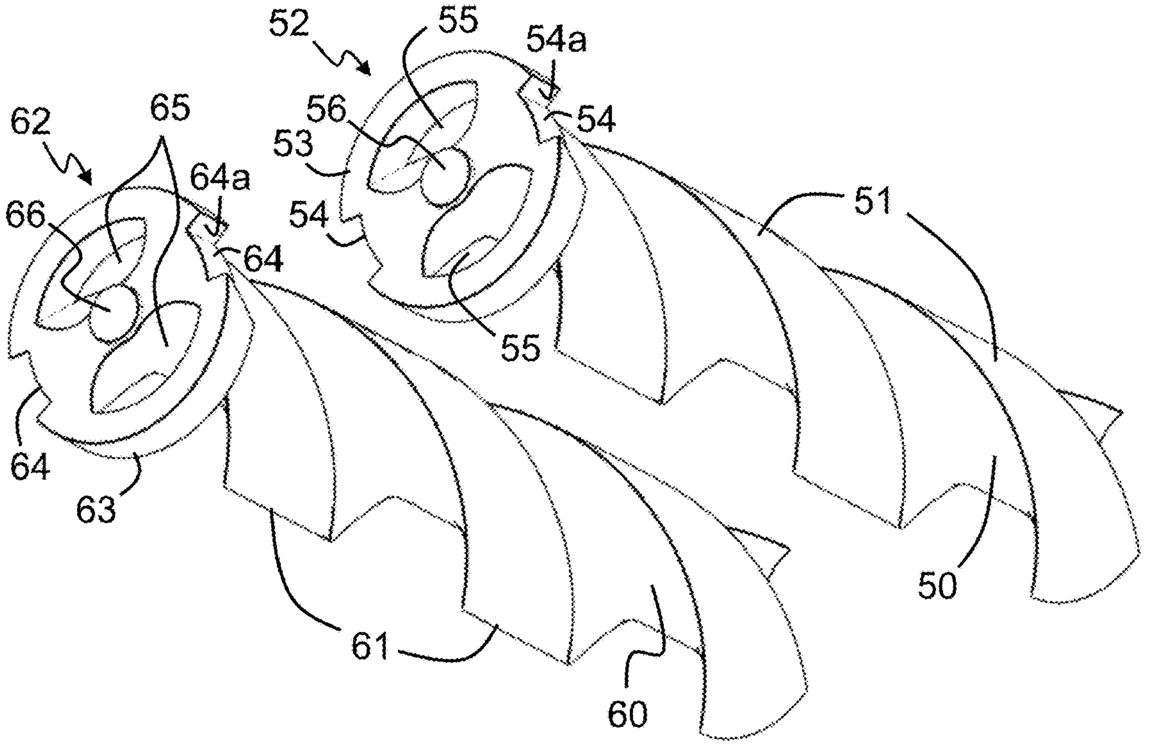
FIG. 10 illustrates a second side of the driven screws in FIG. 9.

FIGS. 9 and 10 show the driven screws 5 and 6. Each driven screw 5, 6 comprises a lubricated polymer material, specifically a PPS material that is devoid of fiber reinforcement containing a solid or dry lubricant, such as polytetrafluorethylene (PTFE), molybdenum disulfide and carbon or graphite. Advantageously, the type and/or concentration of the lubricant in the driven screws 5, 6 may be different to that of the body 41 of the drive screw 4 and/or different to that of the insert 34.

Each driven screw 5, 6 comprises a respective body 50, 60 with a pair of diametrically opposite threads 51, 61 along its length. Each driven screw 5, 6 also comprises a release coupling 52, 62 at one of its ends. Each release coupling 52, 62 is in the shape of a ring 53, 63 with a pair of notches 54, 64 aligned with the adjacent ends of the threads 51, 61. The notches 54, 64 form radial shoulders **54*a*, 64*a*** to which torque can be applied.

The diameter of the ring 53, 63 of each driven screw 5, 6 is larger than that of the threads 51, 61 and holes 55, 65 are defined between the ring 53, 63 and the base of the threads 51, 61. Thus, a fluid passage is defined along the entire length of each driven screw 5, 6, between the threads 51, 61 and through the release coupling 52, 62. Each driven screw 5, 6 also comprises an axial protrusion 56, 66 in the center of each of its ends.

In this example, the threads 51, 61 of the driven screws 5, 6 are self-locking, in that their rotation is prevented if only an axial force is applied to the driven screws 5, 6 at the end of the molding cycle, while they are still in the mold cavity (not shown). As such, torque must be applied to the driven screws 5, 6 to remove them from the mold. The release coupling 52, 62 allows this torque to be applied to the driven screws 5, 6.

In this example, the insert 34 comprises an annular step **32*a*, 32*b* surrounding the part of the flow chamber 32 defined by each of the outer lobes 35*b*, 35*c*. These annular steps 32*a*, 32*b* act as recesses that accommodate the rings 53, 63 when the screws 4, 5, 6 are housed in the flow chamber 32**.

It will also be appreciated that the screw threads 51, 61 can alternatively be designed to be non-self-locking. In such circumstances, the release coupling 52, 62 can be omitted, and the driven screws 5, 6 can be ejected at the end of the molding process by simply applying axial force to them.

For example, the threads can each have a pitch and/or a diameter and/or a configuration that enables them to be ejected from a mold by applying an axial force to it, without applying a rotational force to it. More specifically, the threads can each have a helix angle that enables them to be ejected from a mold by applying an axial force to it, without applying a rotational force to it.

By way of example only, the helix angle can be at least 60°, for example at least 70°, when the threads are made of a polymer, such as lubricated PPS.

Referring now to FIGS. 11 through 15, a screw pump assembly 101 according to a second example is shown, which is similar to the first example in that similar features are marked with like numbers incremented by 100. The screw pump assembly 1 in this example differs from that of the first example in that it comprises three driven screws 105, 106, 107 and that the drive screw has three threads 142, which is more clearly illustrated in FIG. 15.

Therefore, the tubular wall 135 has four cylindrical lobes **135*a*, 135*b*, 135*c*, 135*d*, which approximate the outer profile of the four meshing screws 104, 105, 106, 107. More specifically, the center lobe 135*a* approximates the outer surfaces of the center drive screw 104, with three outer lobes 135*b*, 135*c*, 135*d* evenly distributed around the perimeter of the center lobe 135*a*, each approximating the outer surfaces of a respective driven screw 105, 106, 107**.

Figure 11:
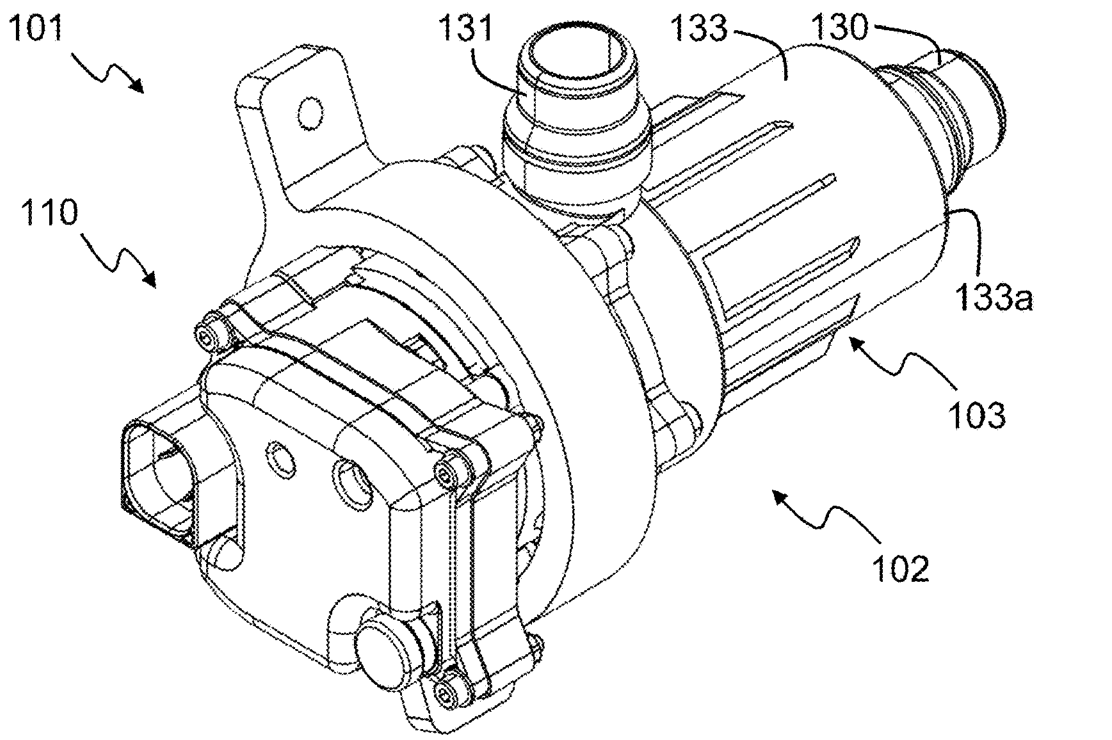
FIG. 11 illustrates a pump assembly according to another aspect of the disclosure.
Figure 12:
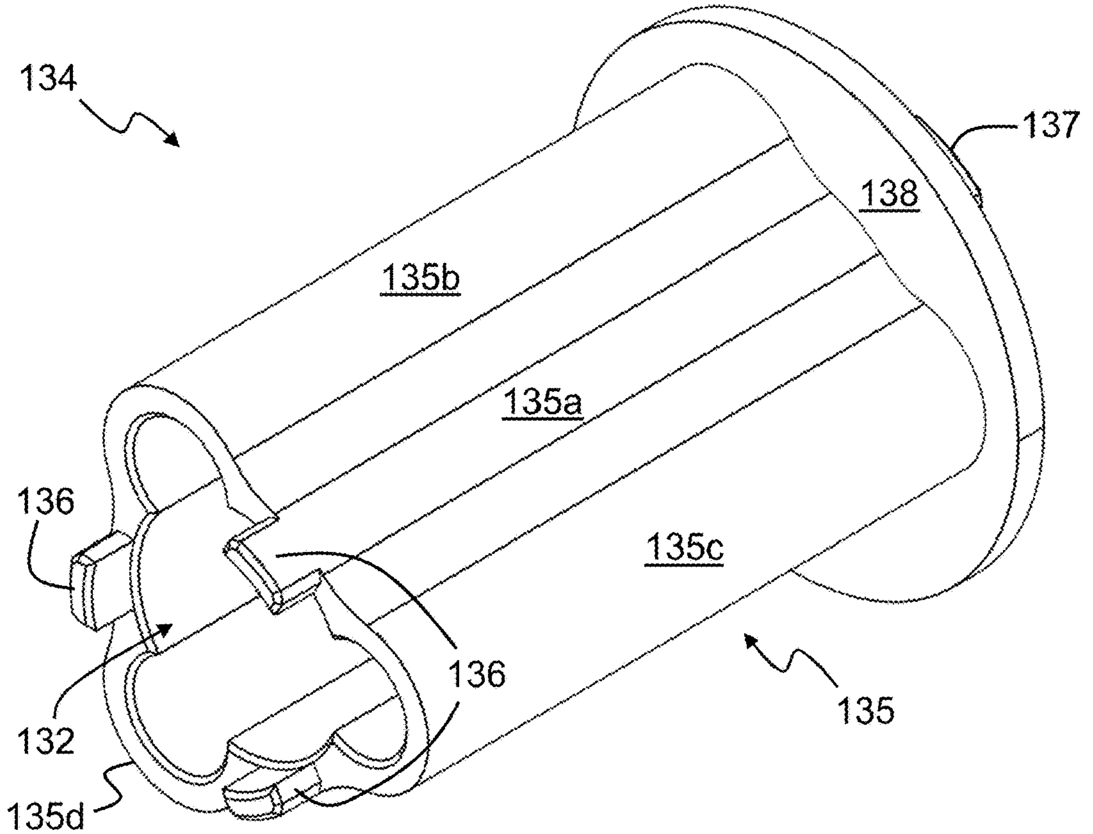
FIG. 12 illustrates a first side of the flow chamber insert of the pump assembly in FIG. 11.
Figure 13:
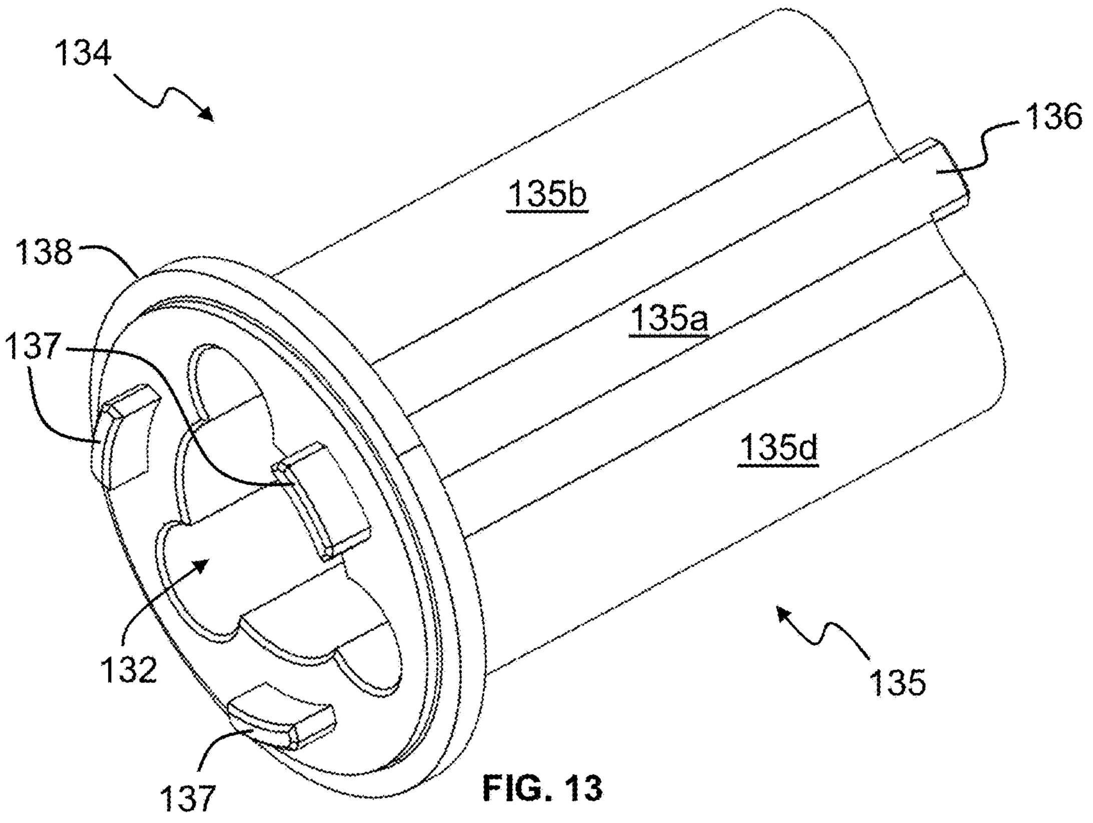
FIG. 13 illustrates a second side of the flow chamber insert in FIG. 12.
Figure 14:
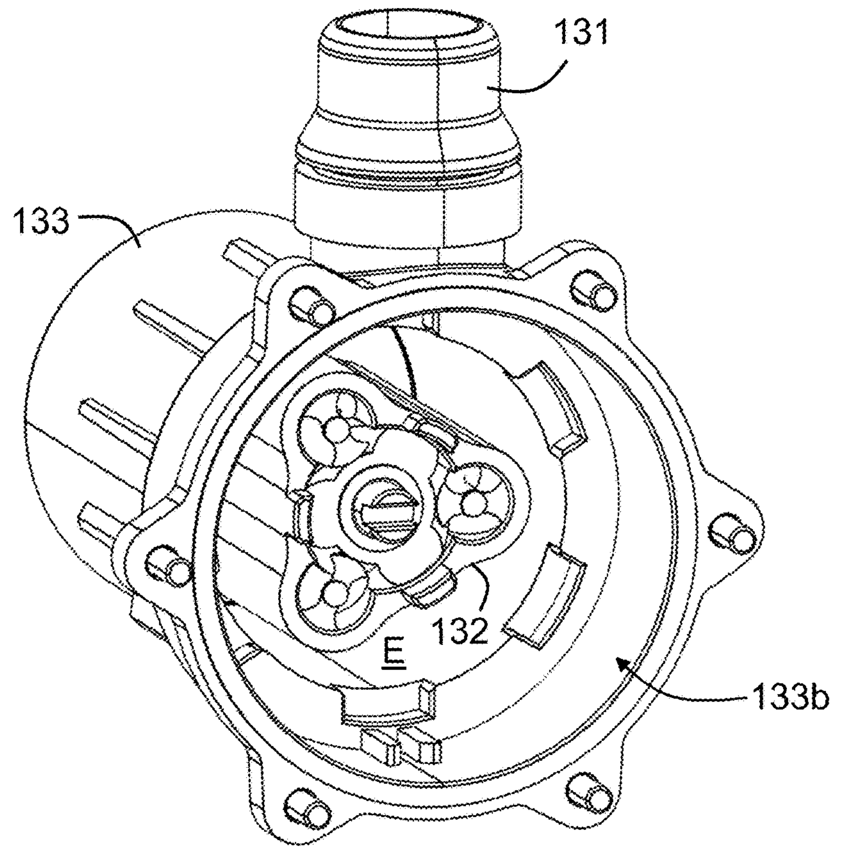
FIG. 14 illustrates the insert in FIGS. 12 and 13 housed in the shell of the casing and with the screws housed in the insert.
Figure 15:
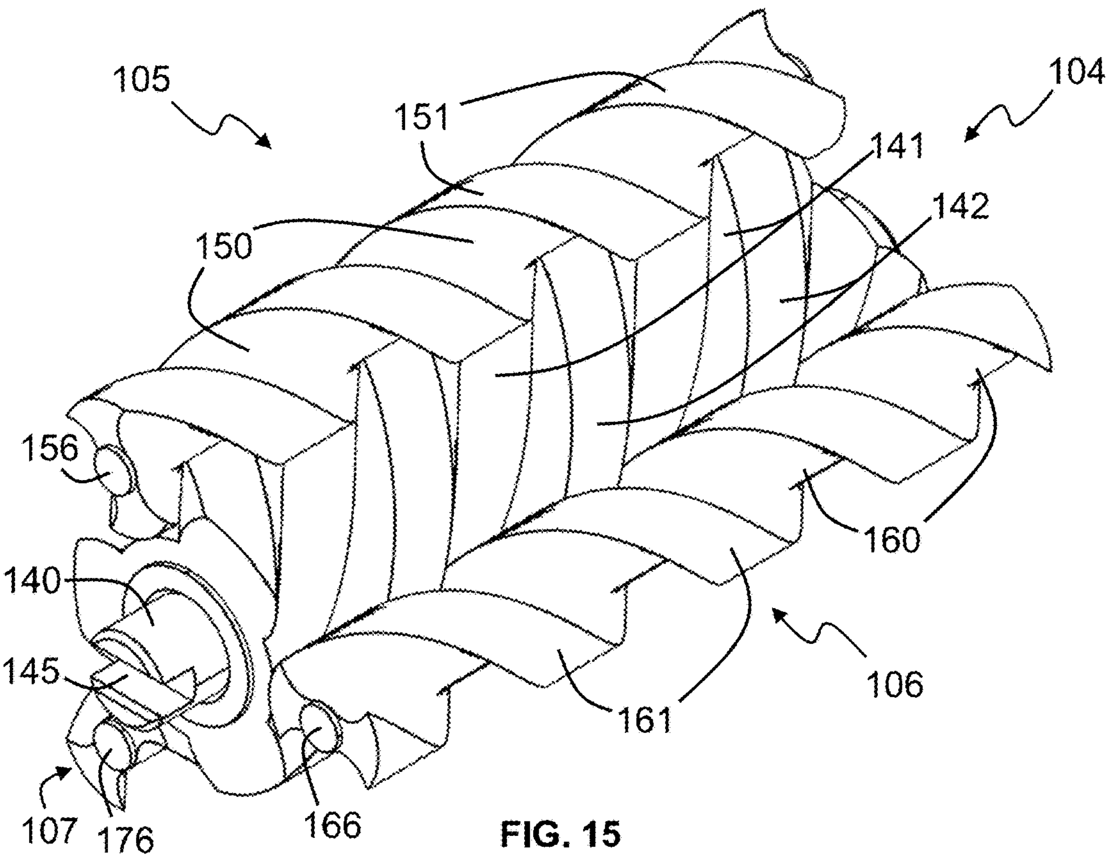
FIG. 15 illustrates the screw assembly of the pump assembly shown in FIG. 11.
Figure 16:
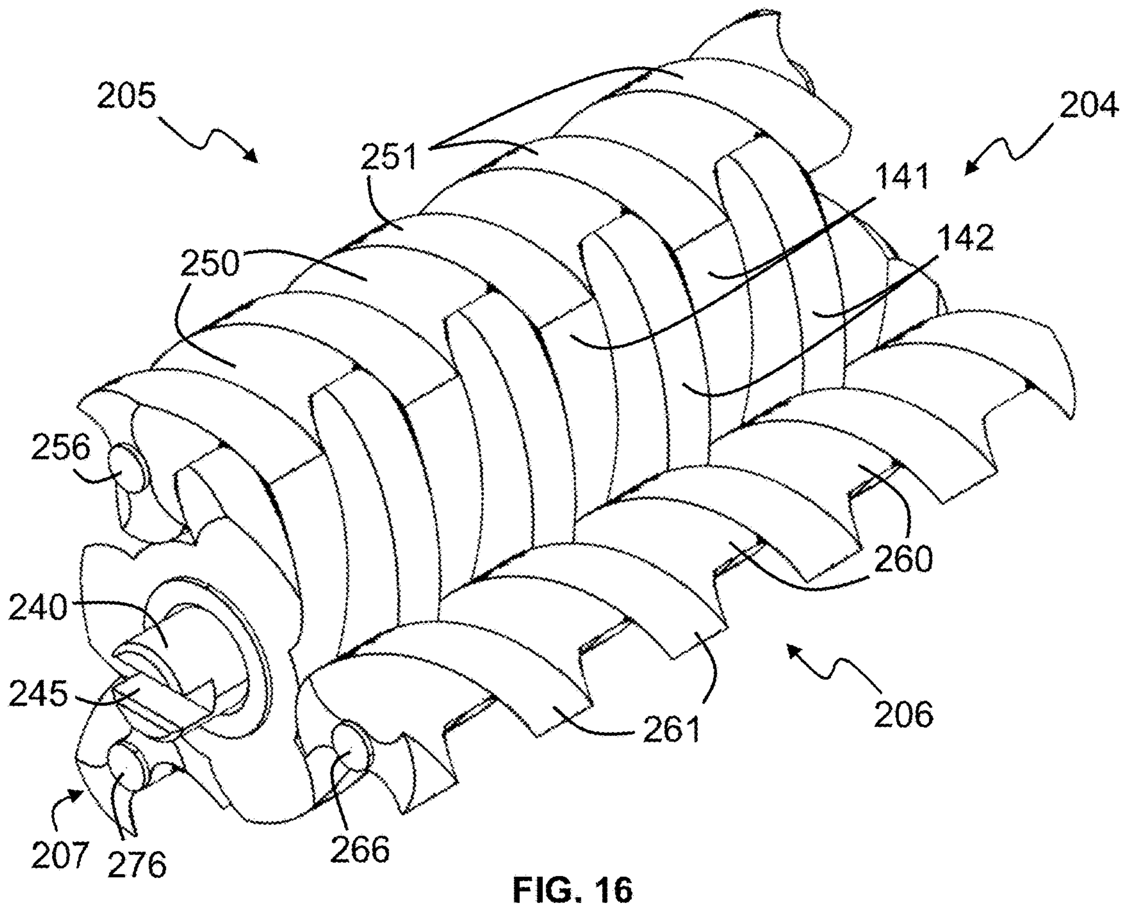
FIG. 16 illustrates another screw assembly that can be used in the pump assembly in FIG. 11 instead of the screw assembly in FIG. 15.

FIG. 16 shows another screw assembly 205, 206, 207 that can be used in the pump assembly in FIG. 11 instead of the screw assembly in FIG. 15. The screws 205, 206, 207 are similar to the ones in the previous example in that similar features are marked by like numbers incremented by 100. The screw assembly 205, 206, 207 in this example differs from the one in the previous example in that the helix angle is greater.

A person skilled in the art will be aware that several variants of the aforementioned aspects are conceivable without departing from the scope of the disclosure.

Throughout the description and claims of this specification, the words "comprise" and "contain" and their variations mean "including but not limited to" and are not intended for (and do not exclude) other parts, additives, components, integers or steps.

Any features, integers, characteristics, compounds or groups described in connection with a particular aspect, embodiment or example of the disclosure are to be understood as being applicable to any other aspect, embodiment or example described herein, unless inconsistent therewith. All of the features disclosed in this specification (including the abstract and accompanying drawings), and/or all of the steps of a method or of a process thus disclosed, can be combined in any combination other than combinations wherein at least some of such features and/or steps are mutually exclusive. The disclosure is not limited to the details of all of the preceding aspects. The disclosure extends to any new feature or any new combination of features disclosed in this specification (including the abstract and accompanying drawings), or to any new feature, or any new combination, of the steps of any method or process thus disclosed.

LIST OF REFERENCE SIGNS

1 screw pump assembly
10 motor
11 flexible coupling
12 first coupling feature
13 second coupling feature
2 screw pump
3 casing
30 inlet pipe
31 outlet pipe
32 flow chamber
32*a* annular step
32*b* annular step
33 shell
33*a* closed end of shell
33*b* open end of shell
34 insert
35 tubular insert wall
35*a* cylindrical center lobe of the tubular wall
35*b* cylindrical outer lobe of the tubular wall
35*c* cylindrical outer lobe of the tubular wall
36 anti-rotation tabs
37 anti-rotation tabs
38 circular flange
39*a* mounting disc
39*b* mounting disc
39*c* spacing interface
4 drive screw
40 drive screw center shaft
41 drive screw body
43 anchoring features
44 axial splines
45 motor coupling
5 driven screw
50 driven screw body
51 driven screw threads
52 release coupling
53 release coupling ring
54 release coupling notch
54*a* radial shoulder
55 hole
56 axial protrusion
6 driven screw
60 driven screw body
61 driven screw threads
62 release coupling
63 release coupling ring
64 release coupling notch
64*a* radial shoulder
65 hole
66 axial protrusion
E space between insert and shell
101 screw pump assembly
110 motor
102 screw pump
103 casing
130 inlet pipe
131 outlet pipe
132 flow chamber
133 shell
133*a* closed end of shell
133*b* open end of shell
134 insert
135 tubular insert wall
135*a* cylindrical center lobe of the tubular wall
135*b* cylindrical outer lobe of the tubular wall
135*c* cylindrical outer lobe of the tubular wall
135*d* cylindrical outer lobe of the tubular wall
136 anti-rotation tabs
137 anti-rotation tabs
138 circular flange
104 drive screw
140 drive screw center shaft
141 drive screw body
145 motor coupling
105 driven screw
150 driven screw body
151 driven screw threads
156 axial protrusion
106 driven screw
160 driven screw body
161 driven screw threads
166 axial protrusion
107 driven screw
176 axial protrusion
204 drive screw
240 drive screw center shaft
241 drive screw body
245 motor coupling
205 driven screw
250 driven screw body
251 driven screw threads
256 axial protrusion
206 driven screw
260 driven screw body
261 driven screw threads
266 axial protrusion
207 driven screw
276 axial protrusion

The invention claimed is:

1. A screw pump, comprising:
a casing with an inlet, an outlet, and a shell;
an insert housed within at least a portion of the shell, and including a flow chamber between the inlet and the outlet, and further including one or more anti-rotation protrusions, configured to inhibit relative rotation between the insert and the shell, wherein the one or more anti-rotation protrusions extend axially from the insert; and
at least two screws housed in the flow chamber to force a fluid flow through the flow chamber from the inlet to the outlet,
wherein at least one of the screws comprises a lubricated polymer material.

2. The screw pump according to claim 1, wherein the lubricated polymer material comprises polyphenylene sulfide.

3. The screw pump according to claim 1, wherein the lubricated polymer material comprises a fiber reinforced lubricated polymer material.

4. The screw pump according to claim 3, wherein the lubricated polymer material comprises a glass fiber reinforced polyphenylene sulfide.

5. The screw pump according to claim 1, wherein the flow chamber is defined by a tubular wall of the insert that has a substantially constant wall thickness.

6. The screw pump according to claim 1, wherein the insert comprises a lubricated polymer material.

7. The screw pump according to claim 1, wherein the insert comprises a lubricated polyphenylene sulfide material.

8. The screw pump according to claim 1, wherein the insert comprises a fiber reinforced lubricated polymer material.

9. The screw pump according to claim 1, wherein the insert comprises a glass fiber reinforced lubricated polyphenylene sulfide.

10. The screw pump according to claim 1, wherein at least one of the screws comprises a center shaft made of a first material on which the at least one of the screws is molded from a second material that is less stiff than the first material.

11. The screw pump according to claim 10, wherein the second material comprises lubricated polymer, such as a lubricated polyphenylene sulfide material.

12. The screw pump according to claim 11, wherein the second material comprises a fiber reinforced lubricated polymer material.

13. The screw pump according to claim 12, wherein the fiber reinforced lubricated polymer material comprises a glass fiber reinforced lubricated polyphenylene sulfide.

14. The screw pump according to claim 1, wherein at least one of the screws comprises threads with a helix angle of at least 60°.

* * * * *